United States Patent
Shiraishi et al.

(10) Patent No.: US 7,295,263 B2
(45) Date of Patent: Nov. 13, 2007

(54) LIQUID CRYSTAL DISPLAY BACKLIGHT'S LIGHT REFLECTION TREATMENT PORTION THAT DIRECTS LIGHT FROM THE LIGHT SOURCE TOWARD THE LCD EXCLUDING A TRANSMISSION REGION OF THE LC

(75) Inventors: Yasuhisa Shiraishi, Mobara (JP); Hisao Hirayama, Mobara (JP); Akio Tezuka, Mobara (JP); Makoto Hasegawa, Chosei (JP)

(73) Assignees: Hitachi Displays, Ltd., Mobara-Shi (JP); Hitachi Displays Devices, Ltd., Mobara-Shi (JP)

( * ) Notice: Subject to any disclaimer, the term of this patent is extended or adjusted under 35 U.S.C. 154(b) by 0 days.

(21) Appl. No.: 10/902,121

(22) Filed: Jul. 30, 2004

(65) Prior Publication Data

US 2005/0024555 A1    Feb. 3, 2005

(30) Foreign Application Priority Data

Jul. 30, 2003    (JP)    ............................. 2003-203706

(51) Int. Cl.
    *G02F 1/1335*    (2006.01)

(52) U.S. Cl. ............................ 349/67; 349/65; 362/623
(58) Field of Classification Search ................... 349/65
    See application file for complete search history.

(56) References Cited

U.S. PATENT DOCUMENTS 7,088,404 B2 *    8/2006    Otake et al. ................. 349/113
2004/0228108 A1 *   11/2004   Lee et al. ..................... 362/31

FOREIGN PATENT DOCUMENTS

JP    2000-350805    12/2000

* cited by examiner

*Primary Examiner*—Andrew Schechter
*Assistant Examiner*—Lucy Chien
(74) *Attorney, Agent, or Firm*—Antonelli, Terry, Stout & Kraus, LLP.

(57) ABSTRACT

A display device suitable for a game machine has dot printed films which are printed on a light guide plate which constitutes a backlight for illuminating a liquid crystal display panel. The dots of the dot printed films are arranged more densely in a window-frame portion corresponding region, which faces a display region of the liquid crystal display panel, and in the vicinity of an inner periphery of a transmission portion corresponding to a region which faces a transmission region.

18 Claims, 8 Drawing Sheets

LIQUID CRYSTAL DISPLAY BACKLIGHT'S LIGHT REFLECTION TREATMENT PORTION THAT DIRECTS LIGHT FROM THE LIGHT SOURCE TOWARD THE LCD EXCLUDING A TRANSMISSION REGION OF THE LC

BACKGROUND OF THE INVENTION

The present invention relates to a liquid crystal display device, and, more particularly, to a liquid crystal display device of the type which is suitably used in a slot-machine-type game machine.

A slot-machine-type game machine is configured so as to include a rotary display drum unit, which consists of three rotary display drums, for example, having the rotary shafts thereof horizontally aligned with each other at the center of a surface which faces a player. When a player pushes a start button, these rotary display drums are rotated; and, thereafter, when the player sequentially pushes stop buttons corresponding to the respective rotary display drums, the rotary display drums are sequentially stopped.

Then, when numerals, symbols and patterns indicated on the outside surface of the respective rotary display drums stop in a state in which they agree with each other, the player becomes a winner of the game and acquires a large number of coins. Recently, a slot-machine-type game machine has been disclosed in Japanese Patent Laid-open No. 350805/2000 (literature 1) in which a display device formed of a liquid crystal display panel or the like, for example, is arranged on front surface sides of the respective rotary display drums, and still images and motion images are visualized thereon to attract the interest of the player.

SUMMARY OF THE INVENTION

However, with respect to a slot-machine-type game machine having such a constitution, since the liquid crystal display panel is arranged at a location which is relatively remote from the rotary display drum unit, when a player plays a game while focusing his or her attention on the rotary display drums, the player is hardly conscious of the displays produced on the liquid crystal display panel, whereby the game machine has a drawback in that it is difficult to impart to the player a feeling of integrity with the displays.

The liquid crystal display device visualizes displayed still images or motion images by mounting a backlight behind the liquid crystal display panel. In this type of liquid crystal display device, as the backlight which illuminates the liquid crystal display panel, a so-called side-edge type backlight has been popularly used. The side-edge type backlight is configured such that a light source, such as a cold cathode fluorescent lamp or a diode array, is arranged close to a side periphery of a light guide plate, which is formed of a transparent material, such as an acrylic resin or the like, and an optical compensation sheet, which is constituted of a light diffusion sheet and a prism sheet, is stacked on a liquid crystal display panel side of the light guide plate. To the side-edge type backlight, light reflection treatment, which reflects light from the light source in the liquid-crystal-display-panel direction, is applied to a back surface of the light guide plate (the surface opposite to the liquid crystal display panel).

In a game machine, such as the slot-machine-type game machine, in which rotary drums are arranged behind the liquid crystal display panel which constitutes the liquid crystal display device, a window-frame-like display region and a transmission region arranged inside the window-frame-like display region are formed on the liquid crystal display panel so that the rotary drums can be observed through the transmission region. Accordingly, to a region of the light guide plate which faces and is aligned with the transmission region of the liquid crystal display panel, a light reflection treatment, such as a dot printed film (or a stripe printed film, a creped film or the like) which constitutes a light reflection material, is not applied.

However, since the light reflection treatment, such as the dot printed film (including a discontinuous printed film, a circular shape, a polygonal shape, a stripe shape and the like); is not provided to the region of the light guide plate which faces the transmission region of the liquid crystal display panel, the quantity of reflected light from the light source is small around the periphery of the transmission region, that is, in the vicinity of a boundary between the display region and the transmission region, whereby this region exhibits a low brightness compared to the display region. That is, the periphery of the transmission region becomes dark. Further, due to the relationship with the arrangement of the light source, certain brightness irregularities arise in the periphery of the transmission region. As a result, the boundary between the display region and the transmission region becomes obscure, thus deteriorating the entertainment effect brought about by the displayed images.

The present invention has been made in view of the above-described circumstances, and it is an object of the present invention to provide a display device which is suitable for a game machine.

The above-mentioned object is achieved by making the brightness in the vicinity of an inner periphery of the window-frame-like display region, which is arranged close to the transmission region of the liquid crystal display panel, largely different from the general brightness of the display region.

A summary of typical aspects of the invention disclosed in this specification is as follows.

According to one aspect of the present invention, there is provided a liquid crystal display device which includes a liquid crystal display panel having a window-frame-like display region and a transmission region positioned inside the window-frame-like display region, and a backlight which is disposed behind the liquid crystal display panel and illuminates the liquid crystal display panel. The backlight includes a light guide plate which is arranged behind the liquid crystal display panel and a light source which is arranged close to at least one side periphery of the light guide plate. The light guide plate includes a light reflection treatment portion which directs light from the light source in a direction toward the liquid crystal display panel in an image display corresponding region excluding a transmission corresponding region, which faces the transmission region of the liquid crystal display panel on a surface thereof opposite to a side on which the liquid crystal display panel is arranged. In this arrangement, the light reflectance of the light reflection treatment portion of the image display corresponding region, which is arranged close to the transmission corresponding region of the light guide plate, and the light reflectance of the reflection treatment portion of the image display corresponding region, of regions of the light guide plate other than the transmission corresponding region, are made different from each other.

Further, in the above-mentioned constitution, the light reflectance of the light reflection treatment portion of the image display corresponding region, which is arranged close to the transmission corresponding region of the light guide plate, is larger than the light reflectance of the reflection treatment portion of the image display corresponding region, of regions of the light guide plate other than the transmission corresponding region.

Still further, in the above-mentioned constitution, the light reflectance of the light reflection treatment portion of the image display corresponding region, which is arranged close to the transmission corresponding region of the light guide plate, is smaller than the light reflectance of the reflection treatment portion of the image display corresponding region, of regions of the light guide plate other than the transmission corresponding region.

According to another aspect of the present invention, there is provided a liquid crystal display device which includes a liquid crystal display panel having an image display region which displays images and a transmission region, and a backlight which is disposed behind the liquid crystal display panel and illuminates the liquid crystal display panel. The backlight includes a light guide plate which is arranged behind the liquid crystal display panel and a light source which is arranged at least at one side periphery of the light guide plate. The light guide plate includes a light reflection treatment portion which directs light from the light source in a direction toward the liquid crystal display panel in an image display corresponding region which faces the image display region of the liquid crystal display panel on a surface thereof opposite to a side on which the liquid crystal display panel is arranged. In this arrangement, the light reflectance of the light reflection treatment portion of the image display corresponding region, which is arranged close to the transmission corresponding region of the light guide plate, and the light reflectance of the reflection treatment portion of the image display corresponding region, of regions of the light guide plate other than the transmission corresponding region, are made different from each other. This embodiment of the present invention is applicable to a case in which the transmission region is formed along the periphery of the liquid crystal display panel, beside the mode in which the transmission region is formed such that the transmission region is surrounded by the image display region which displays images.

Further, in the above-mentioned constitution, the light reflectance of the light reflection treatment portion of the image display corresponding region, which is arranged close to the transmission corresponding region of the light guide plate, is larger than the light reflectance of the reflection treatment portion of the image display corresponding region, of regions of the light guide plate other than the transmission corresponding region.

Still further, in the above-mentioned constitution, the light reflectance of the light reflection treatment portion of the image display corresponding region, which is arranged close to the transmission corresponding region of the light guide plate, is smaller than the light reflectance of the reflection treatment portion of the image display corresponding region, of regions of the light guide plate other than the transmission corresponding region.

According to still another aspect of the present invention, there is provided a liquid crystal display device which includes a liquid crystal display panel having a window-frame-like display region and a transmission region inside the window-frame-like display region, and a backlight which is disposed behind the liquid crystal display panel and illuminates the liquid crystal display panel. The liquid crystal display panel exhibits a brightness which differs between the window-frame-like display region at a portion thereof close to the transmission region and the window-frame-like display region at other portions thereof.

Here, the present invention is not limited to the above-mentioned constitutions and various modifications are conceivable without departing from the technical concept of the present invention.

DESCRIPTION OF THE PREFERRED EMBODIMENTS

Hereinafter, respective embodiments of a liquid crystal display device according to the present invention will be explained in conjunction with the drawings. First of all, an example of a slot machine according to the present invention will be explained.

Figure 1:
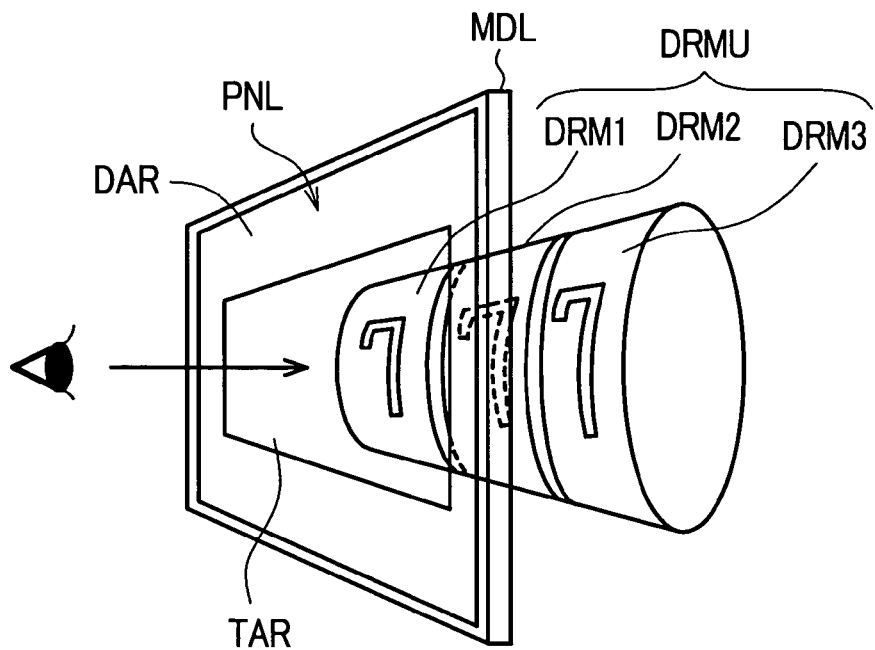
FIG. 1 is a diagrammatic perspective view showing an example of a typical portion of a slot machine.

FIG. 1 is a diagram which shows an example of a typical display portion of a slot machine. The slot machine includes a liquid crystal display device MDL, which is formed of an integral body consisting of a liquid crystal display panel PNL and a backlight, and a rotary display drum unit DRMU, which is disposed behind the liquid crystal display device MDL. In this type of slot machine, usually, the rotary display drum unit DRMU is constituted of three rotary display drums DRM1, DRM2, DRM2, which are capable of being independently rotated about a common rotary axis. On surfaces of the respective rotary drums DRM1, DRM2, DRM3, numerals, symbols or patterns are depicted.

The liquid crystal display device MDL is arranged in front of the rotary display drum unit DRMU. A portion of the liquid crystal display device MDL has a high transmission region TRA which faces and is aligned with the rotary display drum unit DRMU so as to enhance the visibility of characters, numerals or patterns depicted on the respective rotary display drums DRM1, DRM2, DRM3 which constitute the rotary display drum unit DRMU. Further, a window frame portion DAR is provided around the high transmission region TRA and constitutes a display region DAR.

Figure 2:
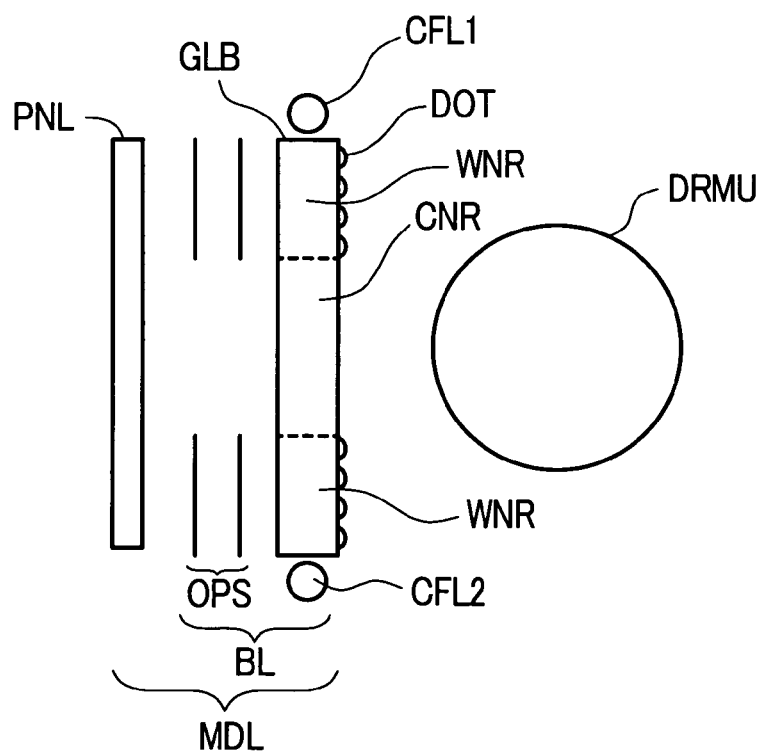
FIG. 2 is side view of the liquid crystal display device and rotary display drum unit shown in FIG. 1.
Figure 3:
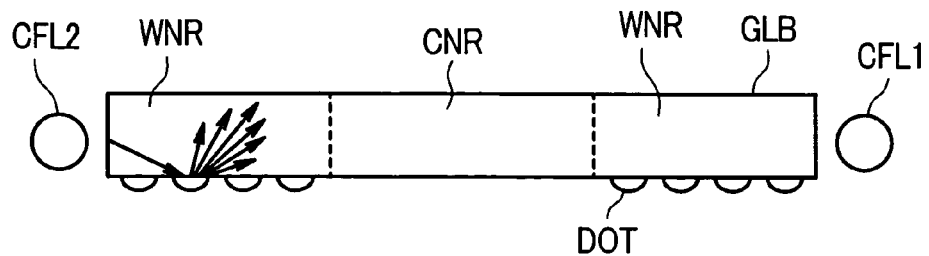
FIG. 3 is a cross-sectional view illustrating a function of the light guide plate shown in FIG. 2.

FIG. 2 is a diagram showing the liquid crystal display device MDL and the rotary display drum unit DRMU of FIG. 1 in more detail. Further, FIG. 3 is a cross-sectional view of the light guide plate which constitutes the backlight shown in FIG. 2. The backlight BL shown in FIG. 2 is constituted by the light guide plate GLB, linear light sources CFL1, CFL2 which are arranged along and close to upper and lower side peripheries of the light guide plate GLB and an optical compensation sheet OPS. Although the light sources CFL1, CFL2 each may be formed of a cold cathode fluorescent lamp, the light sources CFL1, CFL2 also may be formed of a diode array constituted of LED light sources. Further, a light source may be arranged at only one side periphery of the light guide plate GLB, as provided in an embodiment to be described later. Further, with respect to the number of light sources, two or more light sources also may be arranged at each side periphery.

The optical compensation sheet OPS is a stacked body formed of a diffusion sheet and a prism sheet, and it is stacked on the liquid crystal display panel PNL side of the light guide plate GLB. The light guide plate GLB includes a light transmission portion corresponding region CNR at a portion thereof which faces and is aligned with the high transmission region TRA of the liquid crystal display panel PNL in an opposed manner, and it also includes a window-frame portion corresponding region WNR, which is disposed around the transmission portion corresponding region CNR. The window-frame portion corresponding region WNR faces the portion of the liquid crystal display panel PNL which displays images; and, hence, the window-frame portion corresponding region WNR is also referred to as an image display corresponding region. Further, an opening is formed in a portion of the optical compensation sheet OPS which corresponds to the transmission portion corresponding region CNR of the light guide plate GLB, so that optical images of characters, numerals or patterns which are depicted on the surfaces of the respective rotary display drums of the rotary display drum unit DRMU can be observed through the liquid crystal display panel PNL.

FIG. 3 shows a cross section taken along a line which connects the linear light sources CFL1, CFL2 in FIG. 2, for example. On a back surface of the window-frame portion corresponding region WNR of the light guide plate GLB, that is, on a surface of the light guide plate GLB at a side opposite to the liquid crystal display panel PNL, white dots DOT are printed which reflect light incident from the light sources CFL1, CFL2 toward the liquid crystal display panel PNL side, as indicated by the arrows. This is also referred to as a dot printed film. The dot printed film DOT is not applied to the transmission portion corresponding region CNR. Although only the reflection of the incident light from the light source CFL2 is shown in FIG. 3, the same effect is obtained for the incident light from the light source CFL1.

Embodiment 1

Figure 4:
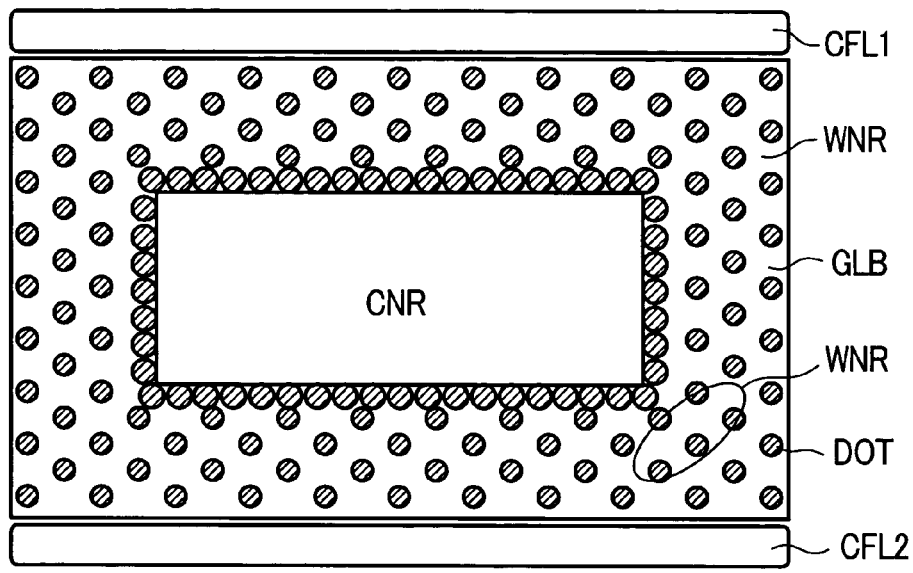
FIG. 4 is a back view of a light guide plate which constitutes the backlight of an embodiment 1 of the liquid crystal display device according to the present invention.

FIG. 4 is a back view of a light guide plate which constitutes an element of the backlight of embodiment 1 of the liquid crystal display device according to the present invention. FIG. 4 shows light sources CFL1, CFL2 together with the light guide plate GLB. In this embodiment, a transmission portion corresponding region CNR is formed in the vicinity of a center portion of the light guide plate GLB. A light reflection treatment is applied to the window-frame portion corresponding region WNR, excluding the transmission portion corresponding region CNR, thus forming a light reflection treatment portion. In this embodiment, a dot printed film DOT is printed on the window-frame portion corresponding region WNR around the transmission portion corresponding region CNR. Further, the printing is performed in such a way that the density of the dot printed film in the vicinity of the inner periphery of the transmission portion corresponding region CNR is set to be higher than the density of the dot printed film in the window-frame portion corresponding region WNR.

In this manner, by setting the density of the dot printed film in the vicinity of the inner periphery of the transmission portion corresponding region CNR so that is higher than the density of the dot printed film in the window-frame portion corresponding region WNR, the light reflection quantity in the window-frame portion corresponding region WNR in the vicinity of the inner periphery of the transmission portion corresponding region CNR is increased. As a result, the brightness of the picture frame portion of the liquid crystal display panel PNL shown in FIG. 1, that is, the brightness of the outer periphery of the transmission region TAR, is increased. That is, the brightness of the vicinity of the inner periphery of the neighboring window-frame-like display region DAR and the brightness of the display region DAR become larger than the brightness of the transmission region TAR. Accordingly, the brightness irregularities around the transmission region TAR can be suppressed, so that the boundary between the display region DAR and the transmission region TAR becomes clear, whereby the entertainment effect obtained by the displayed image or the like can be enhanced. Here, the expression "the brightness differs" in the description of this embodiment means that the brightness differs by 5% or more. In other words, by imparting such a brightness difference, it is possible to obtain an advantageous effect on the suppression of the brightness irregularities.

Embodiment 2

Figure 5:
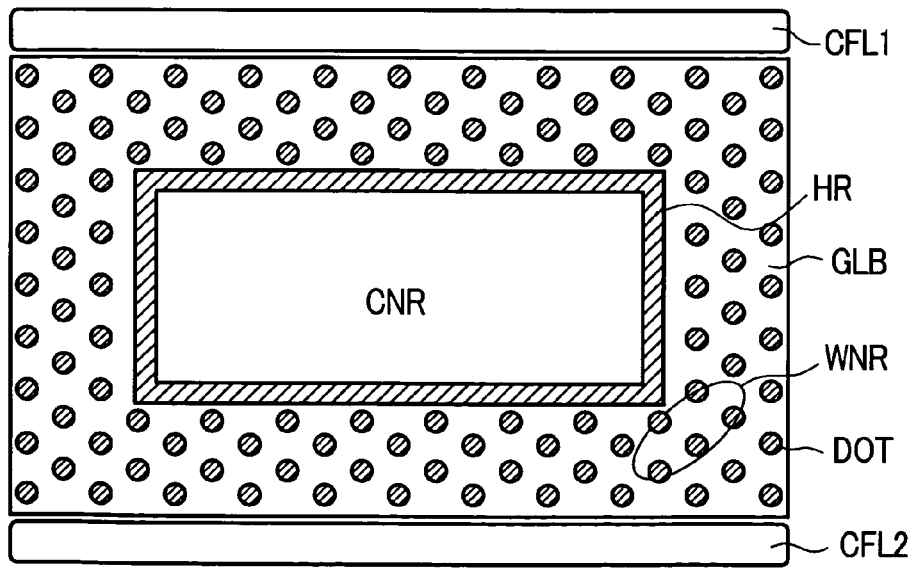
FIG. 5 is a back view similar to FIG. 4 showing a light guide plate which constitutes the backlight of an embodiment 2 of the liquid crystal display device according to the present invention.

FIG. 5 is a back view, similar to FIG. 4, showing the light guide plate which constitutes a backlight of an embodiment 2 of the liquid crystal display device according to the present invention. In this embodiment, a light reflection treatment is applied to the window-frame portion corresponding region WNR, except for the transmission portion corresponding region CNR provided in the vicinity of the center portion of the light guide plate GLB. The dot printed film DOT is printed on the window-frame portion corresponding region WNR around the transmission portion corresponding region CNR. Further, to the vicinity of the inner periphery of the transmission portion corresponding region CNR, mat printed films HR made of a printing material serving as the material of the dot printed film DOT are printed.

In this manner, by providing the mat printed film HR in the vicinity of the inner periphery of the transmission portion corresponding region CNR, the light reflection quantity of the window-frame portion corresponding region WNR in the vicinity of the inner periphery of the transmission portion corresponding region CNR is increased. As a result, the brightness of the picture frame portion of the liquid crystal display panel PNL shown in FIG. 1, that is, the brightness of the outer periphery of the transmission region TAR, is increased. That is, the brightness of the vicinity of the inner periphery of the neighboring window-frame-like display region DAR and the brightness of the display region DAR become larger than the brightness of the transmission region TAR. Accordingly, the brightness irregularities at the periphery of the transmission region can be suppressed; and, hence, the boundary between the display region DAR and the transmission region TAR becomes clear, whereby the entertainment effect brought about by the displayed images is enhanced. Here, the expression "the light reflectance differs" in the description of this embodiment means that, if the light reflectance differs by 20% or more, the entertainment effect is further enhanced.

Embodiment 3

Figure 6A:
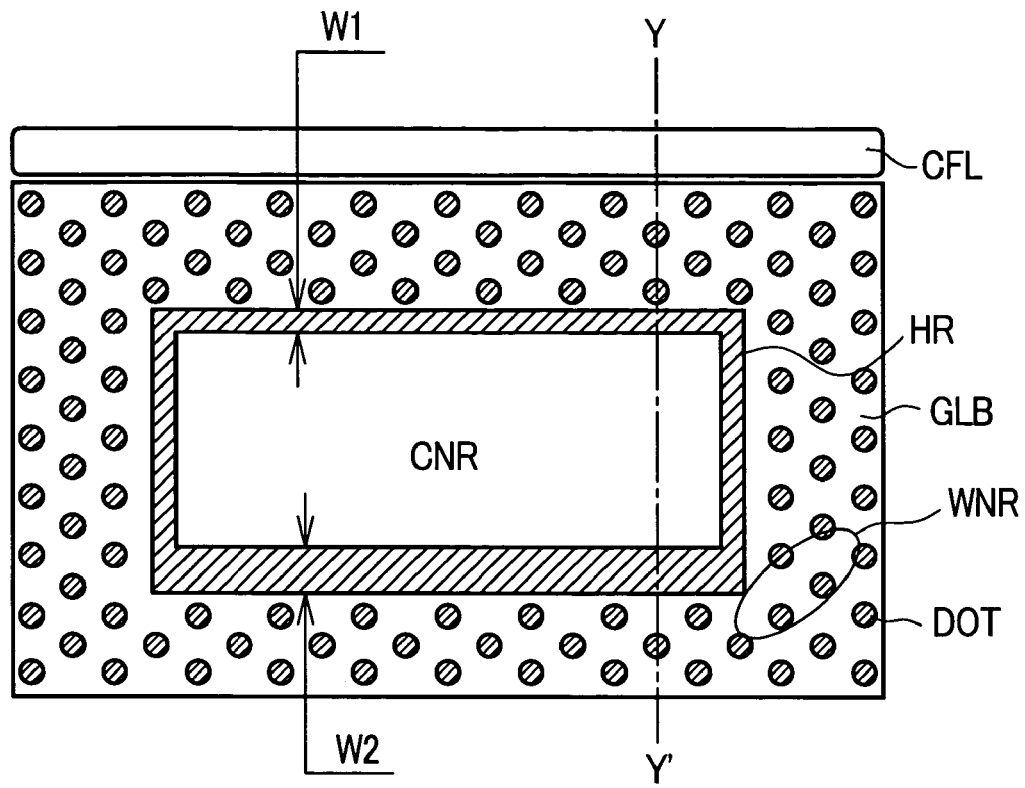
FIG. 6A is a block view and FIG. 6B is a cross-sectional view taken along line Y-Y in FIG. 6A of the light guide plate which constitutes the backlight of an embodiment 3 of the liquid crystal display device according to the present invention.
Figure 6B:
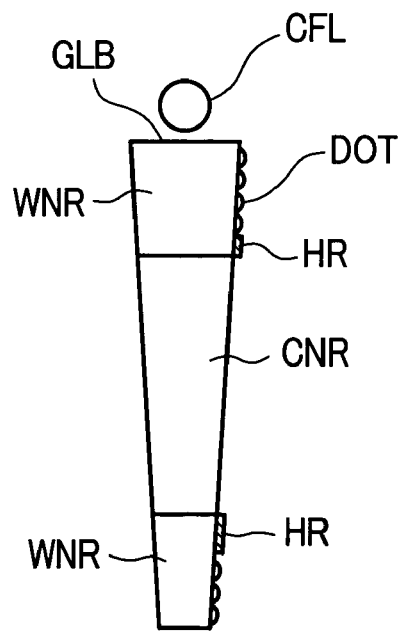

FIG. 6A an FIG. 6B are diagrams of a light guide plate which constitutes the backlight of an embodiment 3 of the liquid crystal display device according to the present invention. FIG. 6A is a back view and FIG. 6B is a cross-sectional view taken along a line Y-Y' in FIG. 6A. The backlight of this embodiment uses a light guide plate GLB having a wedge-shaped cross section, and a light source CFL is arranged only along one side edge where the light guide plate GLB has a large thickness. The light reflection treatment is applied to the window-frame portion corresponding region WNR, excluding the transmission portion corresponding region CNR, which is provided in the vicinity of the center portion of the light guide plate GLB. A dot printed film DOT is printed on the window-frame portion corresponding region WNR around the transmission portion corresponding region CNR, and mat printed films HR that are made of a printing material similar to the material of the dot printed film DOT are printed on the vicinity of the inner periphery of the transmission portion corresponding region CNR.

With respect to the backlight in which the light source CFL is arranged on only one side of the light guide plate GLB, there is a tendency that the remoter a portion of the light guide plate GLB from the light source, the more the quantity of light which propagates in the inside of the light guide plate GLB is decreased. Accordingly, in this embodiment, the width W2 of the mat printed film HR, which is printed on the side remote from the side of the light guide plate GLB on which the light source CFL is arranged, is set to be wider than the width W1 of the mat printed film HR that is printed on the side close to the side of the light guide plate GLB on which the light source CFR is arranged. Here, a dot printed film, which is similar to the dot printed film used in the embodiment described in conjunction with FIG. 4, may be used in place of this mat printed film HR.

In this manner, by providing the mat printed film HR or the high-density dot printed film in the vicinity of the inner periphery of the transmission portion corresponding region CNR, the light reflection quantity of the window-frame portion corresponding region WNR in the vicinity of the inner periphery of the transmission portion corresponding region CNR is increased. As a result, the brightness of the picture frame portion of the liquid crystal display panel PNL shown in FIG. 1, that is, the brightness of the outer periphery of the transmission region TAR, is increased. That is, the brightness of the vicinity of the inner periphery of the neighboring window-frame-like display region DAR and the brightness of the display region DAR become larger than the brightness of the transmission region TAR. Accordingly, the brightness irregularities at the periphery of the transmission region can be suppressed; and, hence, the boundary between the display region DAR and the transmission region TAR becomes clear, whereby the entertainment effect brought about by the displayed images or the like is enhanced.

With respect to the respective embodiments described heretofore, the light reflection treatment film, which is formed on the window-frame portion corresponding region WNR of the light guide plate GLB, is formed of the dot printed film, and the dot printed film is printed with a distribution corresponding to the distribution of light incident on the light guide plate from the light source. Further, as the dot printed film, it may be possible to use a dot printed film in which the areas of the respective dots vary in place of the density distribution of dots having the same area. Further, the shape of a dot may be a circular shape, a polygonal shape, a strip shape and the like. Further, in place of the dot printed film, a so-called crepe, which is formed on the light guide plate by molding, may be used.

Figure 7:
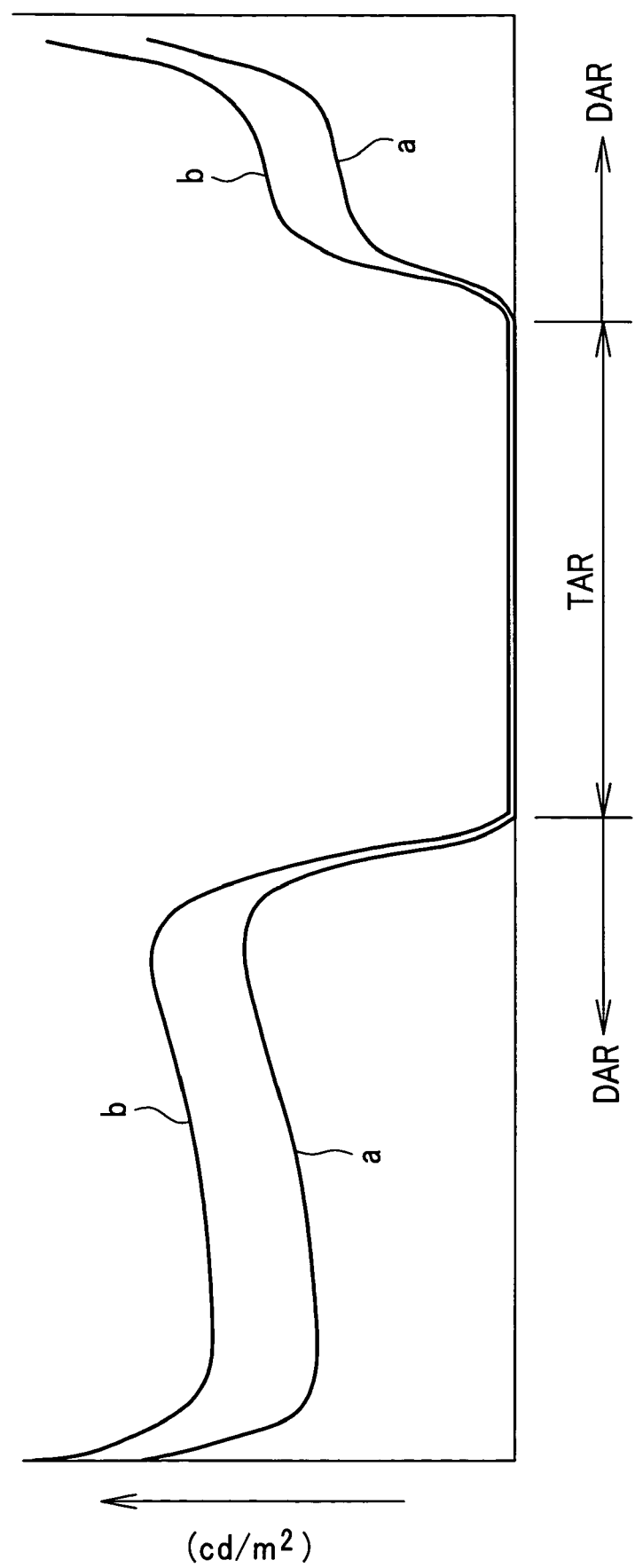
FIG. 7 is a graph showing the brightness on a surface of the liquid crystal display panel shown in FIG. 1 and FIG. 2 when a light guide plate of the respective embodiments of the present invention is used.

FIG. 7 is a graph showing the brightness on a surface of the liquid crystal display panel PNL shown in FIG. 1 and FIG. 2 when a light guide plate of the type described in connection with the respective embodiments of the present invention is used. A line "a" in FIG. 7 shows the relative brightness characteristics in a case in which one prism sheet which constitutes the optical compensation sheet OPS is used and diffusion sheets are stacked on both upper and lower surfaces of the prism sheet and a line "b" shows a case in which two prism sheets are used and diffusion sheets are stacked on both upper and lower surfaces of two prism sheets as shown in FIG. 2. Here, the thickness of the light guide plate is set to 6 mm.

As shown in FIG. 7, compared to the brightness of the display region TAR of the liquid crystal display panel PNL, which faces the transmission portion corresponding region CNR of the light guide plate GLB, the brightness of the display region DAR of the liquid crystal display panel PNL, which faces the window-frame portion corresponding region WNR of the light guide plate GLB, largely differs in both of the case in which one prism sheet is used and the case in which two prism sheets are used. Particularly, the brightness of the display region DAR in the vicinity of the display region TAR is particularly increased.

Accordingly, the periphery of the transmission region TAR becomes bright; and, hence, the boundary between the display region DAR and the transmission region TAR becomes clear, thus enhancing the entertainment effect attributed to images displayed on the display region DAR.

Figure 8:
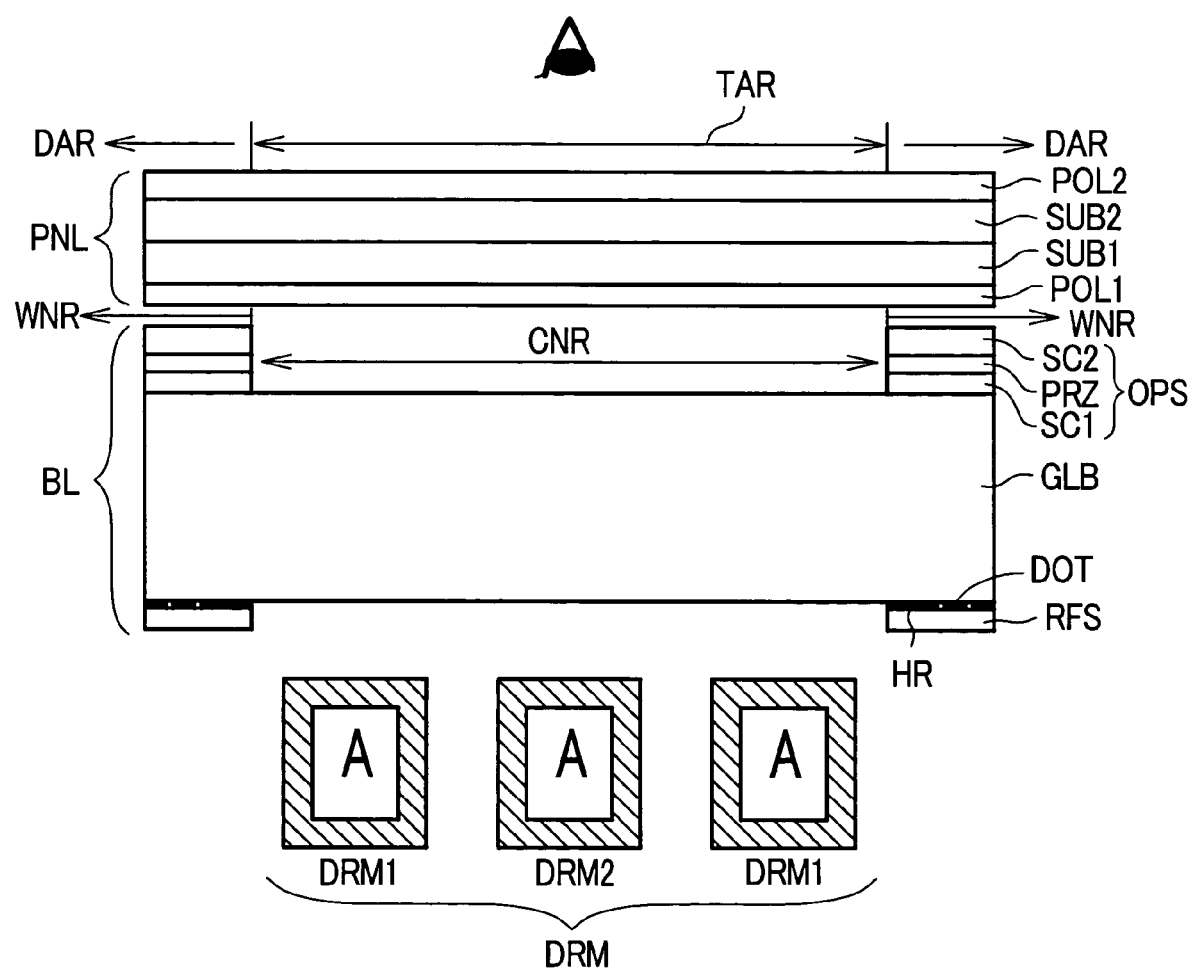
FIG. 8 is a cross-sectional view of the vicinity of the transmission region showing the features of the liquid crystal display device according to the present invention in more detail.

FIG. 8 is a cross-sectional view of the vicinity of the transmission region TAR showing in further detail an example of a representative part of the liquid crystal display device according to the present invention. FIG. 8 shows the liquid crystal display device together with the rotary display unit of FIG. 1. A liquid crystal layer is sealed in a lamination gap between the first substrate SUB1 and the second substrate SUB2, and polarizers POL1, POL2 are respectively laminated to both surfaces of the liquid crystal display panel PNL.

On the other hand, the backlight BL is constituted of the light guide plate GLB, which is formed of an acrylic plate, the optical compensation sheet OPS, which is stacked on the liquid crystal display panel PNL side of the light guide plate GLB, and the reflection sheet RFS, which is arranged on a side opposite to the liquid crystal display panel PNL side. The optical compensation sheet OPS is constituted of one prism sheet PRZ and the first light diffusion sheet SC1 and the second light diffusion sheet SC2, which are formed on both surfaces of the prism sheet PRZ.

On the transmission region corresponding region CNR of the light guide plate GLB, which faces the transmission region TAR of the liquid crystal display panel PNL, the optical compensation sheet OPS is not formed, while on a back surface of the transmission region corresponding region CNR of the light guide plate GLB, the reflection sheet RFS is not formed. Further, on the side (back surface) of the light guide plate GLB opposite to the window frame portion corresponding region WNR, the mat printed film HR (or the high-density dot printed film) and the dot printed film DOT, which were described in conjunction with the above-mentioned embodiment, are formed.

On the back surface of the transmission region corresponding region CNR of the light guide plate GLB, which faces the transmission region TAR of the liquid crystal display panel PNL, the rotary display drum unit DRMU, which is constituted of three rotary display drums DRM1, DRM2, DRM3, is arranged.

Figure 9:
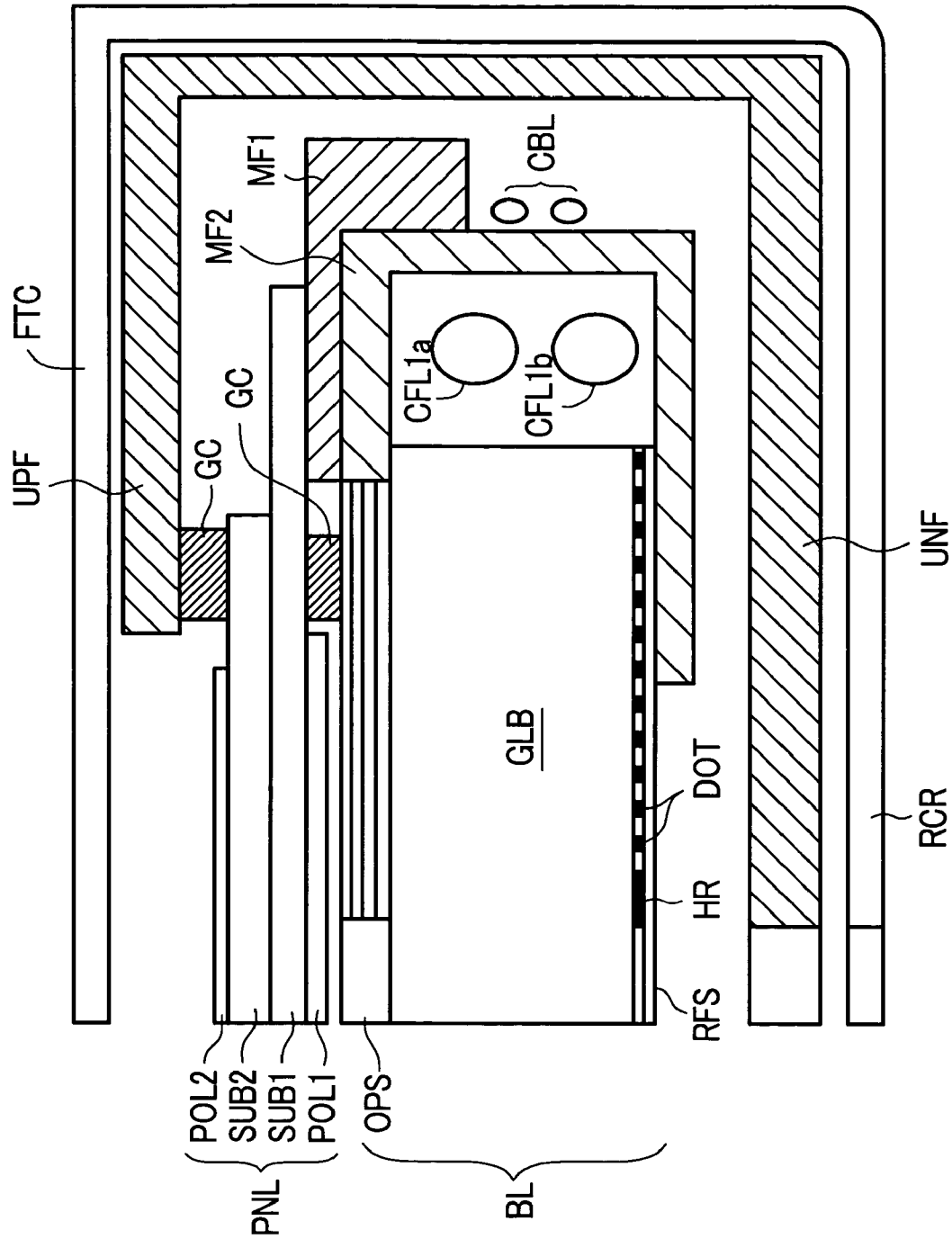
FIG. 9 is a cross-sectional view showing an example of the assembled structure of respective constitutional members of the liquid crystal display device according to the present invention in more detail.

FIG. 9 is a cross-sectional view showing an example of the assembled structure of the respective constitutional members of the liquid crystal display device according to the present invention. FIG. 9 shows the liquid crystal display device together with casings and covers. The backlight BL which was described in conjunction with FIG. 8 is held by an upper inner frame MF1 and a lower inner frame MF2. The light reflection property may be imparted to an inner surface of the lower inner frame MF2 or an optical reflection sheet may be mounted on the inner surface of the lower inner frame MF2. Here, the lower inner frame MF2 may be constituted of a metal material, such as aluminum or the like, which has been subjected to a luster treatment. In the inside of the lower inner frame MF2, two cold cathode fluorescent lamps CFL1a, CFL1b are arranged close to the side edge of the light guide plate GLB. Electric power is supplied to the cold cathode fluorescent lamps CFL1a, CFL1b through a cable CBL from an inverter power source, which will be described later.

The liquid crystal display panel PNL is stacked on the backlight BL and is housed in the upper frame UPF and the lower frame UNF. Rubber cushions GC are inserted between the backlight BL and the liquid crystal display panel PNL and between the liquid crystal display panel PNL and the upper frame UPF so as to ensure a given positional relationship and a shock resistance between elements.

The liquid crystal display device is housed in a rear cover RCR and a front cover FTC is mounted on the liquid crystal display panel PNL side using a hinge such that the front cover FTC can be opened and closed. Parts indicated by the same reference symbols as FIG. 8 correspond to parts having identical functions.

Figure 10:
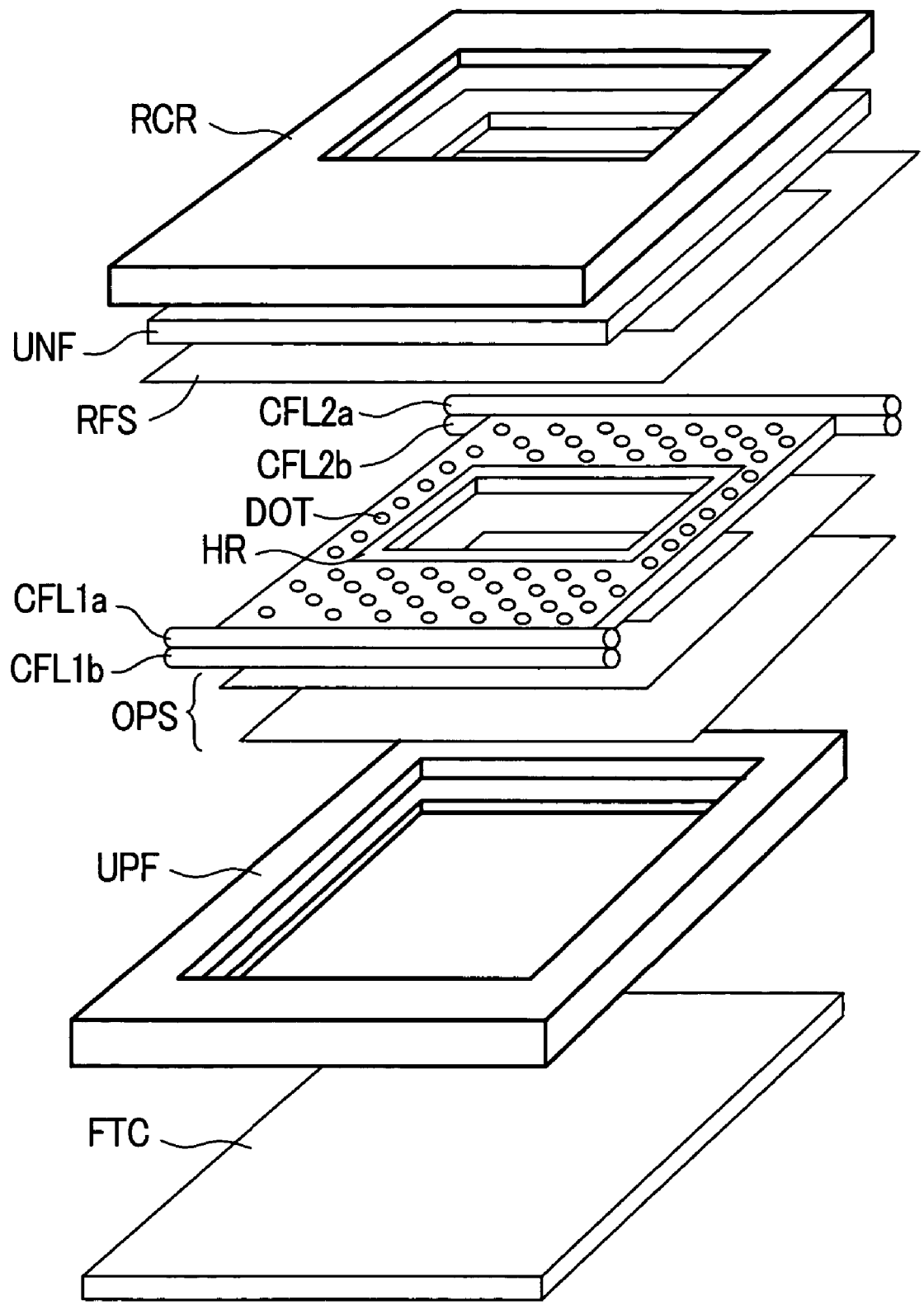
FIG. 10 is a developed perspective view which illustrates a constitutional example of the liquid crystal display device according to the present invention.

FIG. 10 is a developed perspective view showing an example of the liquid crystal display device according to the present invention. Although the constitution of the respective parts shown in FIG. 10 is identical with the constitution shown in FIG. 8 and FIG. 9, their shapes have been simplified. As the constitution of the light guide plate, the light guide plate GLB described in conjunction with FIG. 5 is adopted. The light guide plate GLB is a planar plate having a uniform thickness. As the light source, two pairs of cold cathode fluorescent lamps CFL1a, CFL1b, CFL2a, CFL2b are respectively arranged on two opposing sides of the light guide plate GLB.

Figure 11:
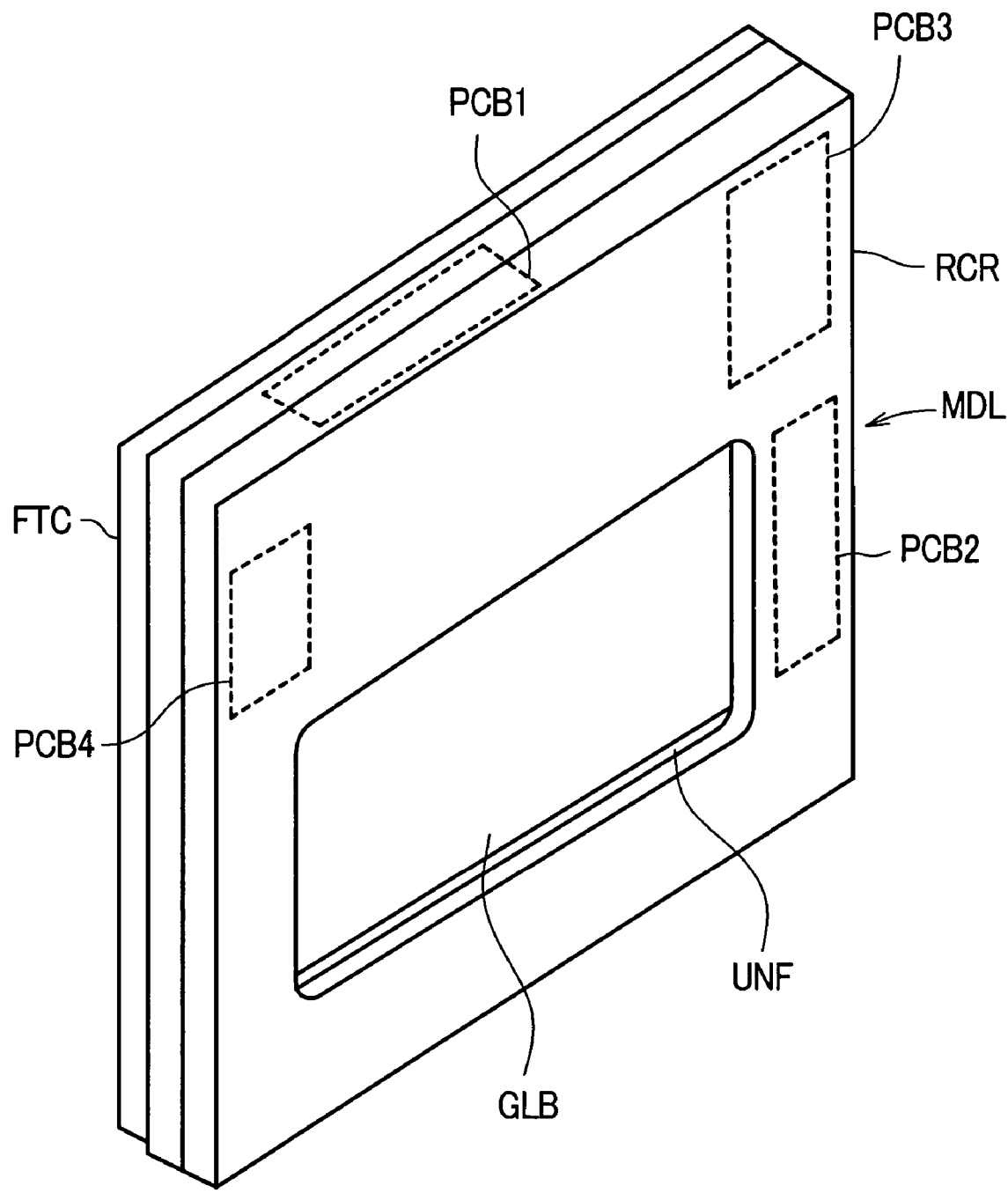
FIG. 11 is a perspective view showing an example of the whole profile of the liquid crystal display device according to the present invention.

FIG. 11 is a perspective view showing an example of the overall shape of the liquid crystal display device according to the present invention as seen from the back surface of the liquid crystal display device on the rotary display drum unit mounting side. The constitution of the liquid crystal display device MDL is exactly the same as the constitution described in conjunction with FIG. 8 to FIG. 10. In the inside of the rear cover, an image processing printed circuit board PCB1, an image display control printed circuit board (a so-called Tcon board) PCB2, a scaling printed circuit board PCB3, and an inverter power source printed circuit board PCB4 are incorporated. The image processing printed circuit board PCB1 mounts a processing circuit for processing image signals to be displayed on the display region DAR of the liquid crystal display panel PNL, while the image display control printed circuit board PCB2 mounts circuits for performing the generation of various timing signals and the sheet signal processing for displaying images based on image signals from the image processing circuit on the liquid crystal display panel PNL.

The scaling printed circuit board PCB3 mounts at least a circuit which determines probability. Further, the inverter power source printed circuit board PCB4 mounts a power source circuit for generating electric power for high-frequency lighting to be supplied to the light source which constitutes the backlight BL.

It is needless to say that the structural and functional features of the respective embodiments described heretofore may be used in a single form or in combination with the features of other embodiments.

As has been explained heretofore, according to the present invention, the brightness of the display region at the boundary with the transmission region is increased; and, hence, the boundary between the display region and the transmission region becomes clear, whereby it is possible to provide a liquid crystal display device that is suitable for a game machine or the like in which the entertainment effect obtained by images displayed on a display region can be largely enhanced.

The invention claimed is:

1. A liquid crystal display device comprising:
a liquid crystal display panel which has a window-frame-like display region and a transmission region inside the window-frame-like display region; and
a backlight which is disposed behind the liquid crystal display panel and illuminates the liquid crystal display panel, wherein
the backlight includes a light guide plate which is arranged behind the liquid crystal display panel and a light source which is arranged close to at least one side periphery of the light guide plate,
the light guide plate includes a light reflection treatment portion which directs light from the light source in the direction toward the liquid crystal display panel in an image display corresponding region excluding a transmission corresponding region which faces the transmission region of the liquid crystal display panel on a surface thereof opposite to a side on which the liquid crystal display panel is arranged, and
the light reflectance of the light reflection treatment portion of the image display corresponding region which is arranged close to the transmission corresponding region of the light guide plate and the light reflectance of the reflection treatment portion of the image display corresponding region of regions of the light guide plate other than the transmission corresponding region are made different from each other.

2. A liquid crystal display device according to claim 1, wherein the light reflectance of the light reflection treatment portion of the image display corresponding region which is arranged close to the transmission corresponding region of the light guide plate is larger than the light reflectance of the reflection treatment portion of the image display corresponding region of regions of the light guide plate other than the transmission corresponding region.

3. A liquid crystal display device according to claim 1, wherein the light reflectance of the light reflection treatment portion of the image display corresponding region which is arranged close to the transmission corresponding region of the light guide plate is smaller than the light reflectance of the reflection treatment portion of the image display corresponding region of regions of the light guide plate other than the transmission corresponding region.

4. A liquid crystal display device according to claim 1, wherein the light reflection treatment portion is formed of discontinuous printed films made of a light reflection material, and the number or the print density per a unit area of the discontinuous printed films in the image display corresponding region close to the transmission corresponding region of the light guide plate is larger than the number or the print density per a unit area of the discontinuous printed films in the image display corresponding region in regions other than the transmission corresponding region of the light guide plate.

5. A liquid crystal display device according to claim 1, wherein the light reflection treatment portion which is applied to the image display corresponding region arranged close to the transmission corresponding region of the light guide plate is formed of mat printed films made of a light reflection material and the light reflection treatment portion which is applied to the image display corresponding region of regions of the light guide plate other than the transmission corresponding region is formed of dot printed films made of a light reflection material.

6. A liquid crystal display device according to claim 5, wherein the light source is arranged on only one side edge of the light guide plate, and
a width of the mat printed film made of the light reflection material which is applied to the image display corresponding region arranged close to the transmission corresponding region at a side remote from the side edge on which the light source is mounted is larger than a width of the mat printed film made of the light reflection material which is applied to the image display corresponding region arranged close to the transmission corresponding region at a side close to the side edge on which the light source is mounted.

7. A liquid crystal display device according to claim 1, wherein the light reflection treatment portion which is applied to the image display corresponding region arranged close to the transmission corresponding region of the light guide plate is formed of mat printed films made of a light reflection material and the light reflection treatment portion which is applied to the image display corresponding region of regions of the light guide plate other than the transmission corresponding region is formed of stripe printed films made of a light reflection material.

8. A liquid crystal display device according to claim 7, wherein the light source is arranged on only one side edge of the light guide plate, and
a width of the mat printed film made of the light reflection material which is applied to the image display corresponding region arranged close to the transmission corresponding region at a side remote from the side edge on which the light source is mounted is larger than a width of the mat printed film made of the light reflection material which is applied to the image display corresponding region arranged close to the transmission corresponding region at a side close to the side edge on which the light source is mounted.

9. A liquid crystal display device according to claim 1, wherein the light reflection portion is formed of a large number of crepes formed on the light guide plate, and the forming number or the forming density per a unit area of the crepes applied to the image display corresponding region arranged close to the transmission corresponding region of the light guide plate is set larger than the forming number or the forming density per a unit area of the crepes applied to the image display corresponding region at regions other than the transmission region.

10. A liquid crystal display device according to claim 1, wherein an optical sheet is provided between the liquid crystal display panel and the backlight, and
the optical sheet includes an opening in a region thereof which faces the transmission region.

11. A liquid crystal display device according to claim 10, wherein optical sheet is constituted of a stacked body formed of a light diffusion sheet and a prism sheet.

12. A liquid crystal display device comprising:
a liquid crystal display panel which has an image display region which displays images and a transmission region; and
a backlight which is disposed behind the liquid crystal display panel and illuminates the liquid crystal display panel, wherein
the backlight includes a light guide plate which is arranged behind the liquid crystal display panel and a light source which is arranged at least one side periphery of the light guide plate,
the light guide plate includes a light reflection treatment portion which directs light from the light source in the direction toward the liquid crystal display panel in an image display corresponding region which faces the image display region of the liquid crystal display panel on a surface thereof opposite to a side on which the liquid crystal display panel is arranged, and
the light reflectance of the light reflection treatment portion of the image display corresponding region which is arranged close to the transmission corresponding region of the light guide plate and the light reflectance of the light reflection treatment portion of the image display corresponding region of regions of the light guide plate other than the transmission corresponding region are made different from each other.

13. A liquid crystal display device according to claim 12, wherein the light reflectance of the light reflection treatment portion of the image display corresponding region which is arranged close to the transmission corresponding region of the light guide plate is larger than the light reflectance of the reflection treatment portion of the image display corresponding region of regions of the light guide plate other than the transmission corresponding region.

14. A liquid crystal display device according to claim 12, wherein the light reflectance of the light reflection treatment portion of the image display corresponding region which is arranged close to the transmission corresponding region of the light guide plate is smaller than the light reflectance of the light reflection treatment portion of the image display corresponding region of regions of the light guide plate other than the transmission corresponding region.

15. A liquid crystal display device according to claim 12, wherein the light reflection treatment portion is formed of discontinuous printed films made of a light reflection material, and the number or the print density per a unit area of the discontinuous printed films in the image display corresponding region close to the transmission corresponding region of the light guide plate is larger than the number or the print density per a unit area of the discontinuous printed films in the image display corresponding region in regions other than the transmission corresponding region of the light guide plate.

16. A liquid crystal display device according to claim 12, wherein the light reflection treatment portion which is applied to the image display corresponding region arranged close to the transmission corresponding region of the light guide plate is formed of mat printed films made of a light reflection material and the light reflection treatment portion which is applied to the image display corresponding region of regions of the light guide plate other than the transmission corresponding region is formed of dot printed films made of a light reflection material.

17. A liquid crystal display device according to claim 12, wherein the light reflection treatment portion which is applied to the image display corresponding region arranged close to the transmission corresponding region of the light guide plate is formed of mat printed films made of a light reflection material and the light reflection treatment portion which is applied to the image display corresponding region of regions of the light guide plate other than the transmission corresponding region is formed of stripe printed films made of a light reflection material.

18. A liquid crystal display device according to claim 12, wherein the light reflection portion is formed of a large number of crepes formed on the light guide plate, and the forming number or the forming density per a unit area of the crepes applied to the image display corresponding region arranged close to the transmission corresponding region of the light guide plate is set larger than the forming number or the forming density per a unit area of the crepes applied to the image display corresponding region at regions other than the transmission region.

* * * * *